(12) United States Patent
Maeda et al.

(10) Patent No.: US 9,844,915 B2
(45) Date of Patent: Dec. 19, 2017

(54) LAMINATE MOLDING EQUIPMENT AND LAMINATE MOLDING METHOD

(71) Applicant: Matsuura Machinery Corporation, Fukui, Fukui (JP)

(72) Inventors: Toshio Maeda, Fukui (JP); Hiroshi Arakawa, Fukui (JP); Yasunori Takezawa, Fukui (JP); Toshihiko Kato, Fukui (JP); Koichi Amaya, Fukui (JP)

(73) Assignee: Matsuura Machinery Corporation, Fukui City, Fukui (JP)

( * ) Notice: Subject to any disclaimer, the term of this patent is extended or adjusted under 35 U.S.C. 154(b) by 452 days.

(21) Appl. No.: 14/556,133

(22) Filed: Nov. 29, 2014

(65) Prior Publication Data

US 2015/0283761 A1 Oct. 8, 2015

(30) Foreign Application Priority Data

Apr. 4, 2014 (JP) ................................. 2014-077412

(51) Int. Cl.
*B29C 67/00* (2017.01)
*B33Y 30/00* (2015.01)
(Continued)

(52) U.S. Cl.
CPC ........ *B29C 67/0088* (2013.01); *B29C 64/153* (2017.08); *B29C 64/386* (2017.08);
(Continued)

(58) Field of Classification Search
CPC .................................................. B29C 67/0077
See application file for complete search history.

(56) References Cited

U.S. PATENT DOCUMENTS 5,993,549 A * 11/1999 Kindler ..................... B05B 7/22
  118/308
2005/0179772 A1* 8/2005 Ishikawa ............ B23K 26/0604
  347/255

(Continued)

FOREIGN PATENT DOCUMENTS

| JP | 2000-225647 A | 8/2000 |
| JP | 2009-006509 A | 1/2009 |
| JP | 2010-132961 A | 6/2010 |

*Primary Examiner* — Ryan Ochylski
(74) *Attorney, Agent, or Firm* — Richard M. Goldberg

(57) ABSTRACT

Laminate molding equipment includes a molding part with a molding table on which a three-dimensional shape molded object is molded, a powder layer forming part supplying material powder on the molding table to form a powder layer, a light beam radiating part radiating a light beam to the powder layer to form a solidified layer, the powder layer forming part includes powder laminating equipment sequentially forming the powder layer on the molding table by moving along a predetermined direction at the molding table, and a moving position detecting unit detecting a moving position along the predetermined direction at the powder laminating equipment, and the control part recognizes the moldable region by output from the moving position detecting unit, and controls the light beam radiating part, and scans the position of the light beam by adjusting angles of two scan mirrors according to processing data of controlling the scanning device.

2 Claims, 6 Drawing Sheets

(51) Int. Cl.
*B33Y 50/02* (2015.01)
*B33Y 10/00* (2015.01)
*B29C 64/153* (2017.01)
*B29C 64/386* (2017.01)
*B22F 3/105* (2006.01)

(52) U.S. Cl.
CPC .............. *B33Y 10/00* (2014.12); *B33Y 30/00* (2014.12); *B33Y 50/02* (2014.12); *B22F 2003/1057* (2013.01); *Y02P 10/295* (2015.11)

(56) References Cited

U.S. PATENT DOCUMENTS

| | | | | |
|---|---|---|---|---|
| 2009/0206065 | A1* | 8/2009 | Kruth | B22F 3/1055 219/121.66 |
| 2010/0031882 | A1* | 2/2010 | Abe | B29C 67/0077 118/620 |
| 2010/0176539 | A1* | 7/2010 | Higashi | B22F 3/1055 264/497 |

* cited by examiner (a)

(b)

(c)

LAMINATE MOLDING EQUIPMENT AND LAMINATE MOLDING METHOD

TECHNICAL FIELD

The present invention relates to laminate molding equipment and a laminate molding method, in which a light beam or an electron beam is radiated to material powder to mold a three-dimensional shape molded object.

BACKGROUND OF THE INVENTION

In prior arts, it is known that laminate molding equipment is configured to manufacture a three-dimensional shape molded object by repeating processes of radiating a light beam or an electron beam to a powder layer formed of material powder to form a solidified layer, forming a new powder layer on this solidified layer, and laminating the solidified layer by radiating the light beam or electron beam. The laminate molding equipment thus configured includes a molding part provided with a molding table on which the three-dimensional shape molded object is molded, and a powder layer forming part that supplies the material powder on the molding table to form the powder layer, a light beam or electron beam radiating part that radiates the light beam or electron beam to the powder layer laminated on the molding table to melt and solidify the powder layer to form the solidified layer, and a control part that controls operation of the respective parts. The basic operating processes executed by the above-described laminate molding equipment are repetitions of the following processes: forming the powder layer of the material powder on the molding table; radiating the light beam or electron beam to a region corresponding to a cross-sectional shape of a molded object on the powder layer to selectively form the solidified layer; and lowering the molding table by a setting height and forming the powder layer of a new material powder on the solidified layer (see Patent Document 1, for example).

CITATION LIST

Patent Document

Patent Document 1: JP 2010-132961 A

SUMMARY OF INVENTION

Problems to be Solved by the Invention

According to the operation of the laminate molding equipment in the above mentioned prior art, the process of forming the powder layer on the molding table and the process of radiating the light beam or electron beam to a mold region on the powder layer and selecting the region to form the solidified layer are executed at different times, and therefore radiation of the light beam or electron beam to the powder layer is forced to wait until completion of formation of the powder layer. With this configuration, the time required for the repeatedly executed process of forming the powder layer is to be a waiting period for the processing of radiating the light beam or electron beam, and so the problem of prolonging entire molding time happened. Especially, in the case where area of the molding table is large, the time required to form one powder layer becomes long, and there is an inevitable problem in which the molding time is prolonged because such a time is repeated a plurality of times.

The present invention is made to solve such a problem, and an object thereof is to shorten the molding time by starting radiation of the light beam or electron beam without waiting for completion of formation of the powder layer.

Solution to Problem

To solve above mentioned problem, laminate molding equipment and a laminate molding method according to the present invention are achieved and based on the basic configurations as is described below.

(1) Laminate molding equipment includes: a molding part provided with a molding table on which a three-dimensional shape molded object is molded; a powder layer forming part configured to supply material powder on the molding table to form a powder layer; a light beam or electron beam radiating part configured to radiate a light beam or an electron beam to the powder layer laminated on the molding table and select a region to form a solidified layer, wherein the powder layer forming part includes powder laminating equipment configured to sequentially form the powder layer on the molding table by moving along a predetermined direction at the molding table, and a moving position detecting unit configured to detect a moving position along the predetermined direction at the powder laminating equipment, and wherein the control part recognizes the moldable region by output from the moving position detecting unit, and controls the light beam or electron beam radiating part, and scans the radiating position of the light beam or electron beam on the powder layer by adjusting angles of the two scan mirrors according to the processing data of controlling the scanning device based on the recognition thereof and wherein the powder layer forming process and beam radiating process can be partially executed at the same time.

(2) A laminate molding method includes: a powder layer forming process of forming a powder layer of material powder on a molding table; and a light beam or electron beam radiating process of radiating a light beam or an electron beam on the powder layer and selecting a region to form a solidified layer, wherein a moldable region is recognized on the powder layer already formed while powder layer forming is started and forming of one powder layer is completed in the powder layer forming process wherein the radiating position of the light beam or electron beam is scanned on the powder layer in accordance with the processing data by controlling the scanning device and adjusting angles of the two scan mirrors based on the recognition thereof and wherein the powder layer forming process and beam radiating process can be partially executed at the same time.

Effect of the Invention

According to the laminate molding equipment or the laminate molding method based on the above-described basic configurations, the molding time can be shortened by starting radiation of the light beam or electron beam without waiting for completion of formation of the powder layer.

DETAILED DESCRIPTION

Figure 1:
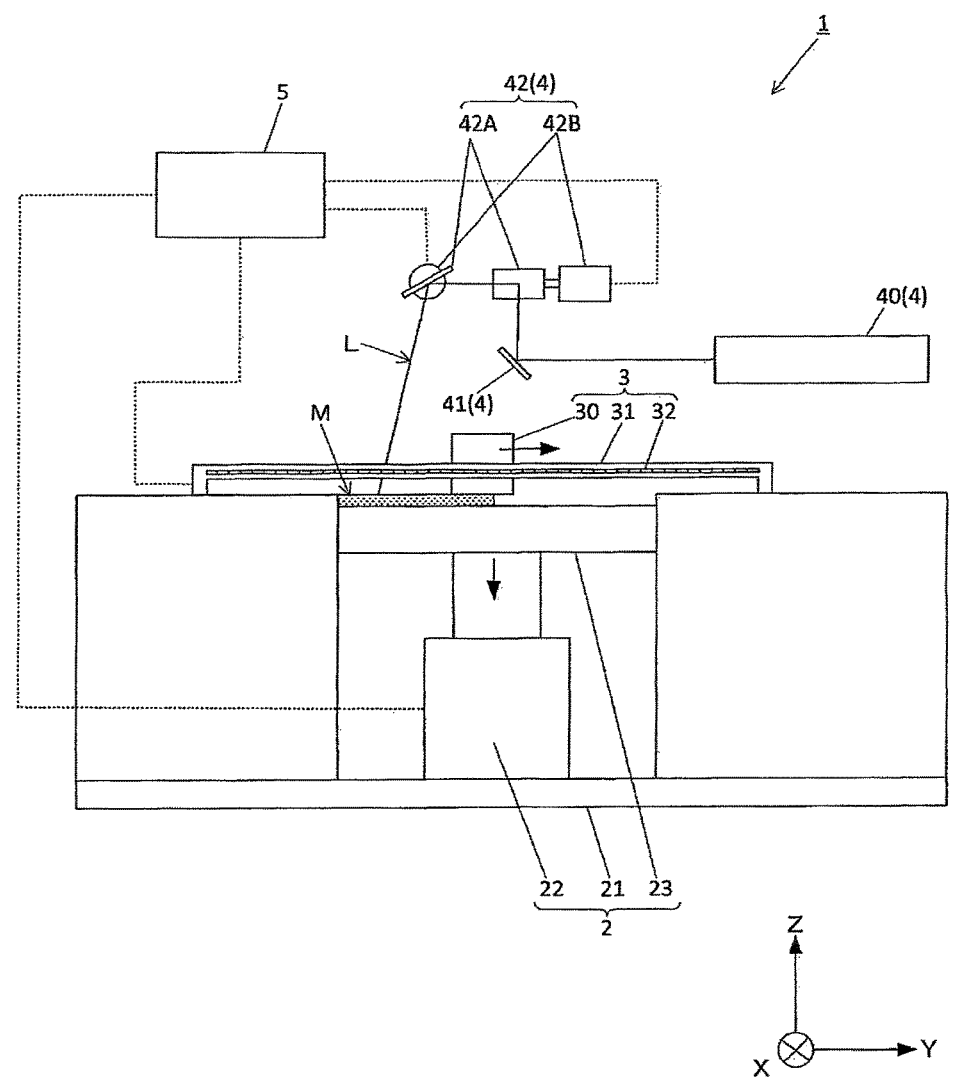
FIG. 1 is an explanatory drawing illustrating a schematic configuration of laminate molding equipment according to an embodiment of the present invention.

In the following, an embodiment of the present invention will be described with reference to the drawings. FIG. 1 is an explanatory drawing illustrating a schematic configuration of laminate molding equipment according to an embodiment of the present invention. Laminate molding equipment 1 includes, as a basic configuration, a molding part 2, a powder layer forming part 3, a light beam or electron beam radiating part 4, and a control part 5.

The molding part 2 includes a molding table 23 on which a three-dimensional shape molded object is formed. Additionally, the molding part 2 includes a base 21 as a base of the equipment, and an elevating device 22 mounted on the base 21 and configured to vertically move the molding table 23. The molding table 23 is formed of material similar to material powder to be supplied thereon, or material adhered to the material powder melted and solidified.

The powder layer forming part 3 supplies the material powder on the molding table 23 to form a powder layer M, and includes powder laminating equipment 30 that sequentially forms the powder layer M on the molding table 23, moving the molding table 23 along a single direction (Y-axis direction in FIG. 1). The powder laminating equipment 30 supplies the material powder linearly along one side of the molding table 23 (side along X-axis direction in FIG. 1) where the material powder is accumulated. Further, the powder layer forming part 3 includes a moving device 31 that moves the powder laminating equipment 30 along a direction of the molding table 23 (along Y-axis direction in FIG. 1), and the moving device 31 includes a moving position detecting unit 32 that detects a moving position of the powder laminating equipment 30 along the single direction (Y-axis direction in FIG. 1).

The light beam or electron beam radiating part 4 radiates a light beam or an electron beam L to the powder layer M laminated on the molding table 23 and selectively &tins a solidified layer, and includes a light beam or electron beam oscillator 40 that oscillates the light beam or electron beam L, a reflecting optical system 41 that conducts the light beam or electron beam L emitted from the light beam or electron beam oscillator 40 to a light beam or electron beam scanning unit 42, and the light beam or electron beam scanning unit 42 that radiates the light beam or electron beam L to an optional position on the powder layer M in accordance with processing data. The light beam or electron beam oscillator 40 may be formed of a carbon dioxide laser and a YAG laser. The light beam or electron beam scanning unit 42 includes two scan mirrors 42A that reflect the light beam or electron beam L, and scanning device 42B that rotate these scan mirrors 42A around two different axes. The light beam or electron beam scanning unit 42 can scan an optional position in a radiated location of the light beam or electron beam L on the powder layer M in accordance with the processing data by controlling the scanning device 42B and adjusting angles of the two scan mirrors 42A.

The control part 5 detects a position of the powder laminating equipment 30 with recognition of the moldable region on the powder layer according to detection by a moving position detecting unit 32 and controls the light beam or electron beam scanning unit 42 to scan in accordance with the processing data of controlling the scanning device 42B based on the recognition thereof by adjusting angles of the two scan mirrors 42A. Also, the control part 5 controls the elevating device 22 to gradually lower height of the molding table 23 every time when the powder layer forming part 3 forms one powder layer on the molding table 23 and the light beam or electron beam scanning unit 42 applies processing treatment to the one powder layer.

Figure 2:
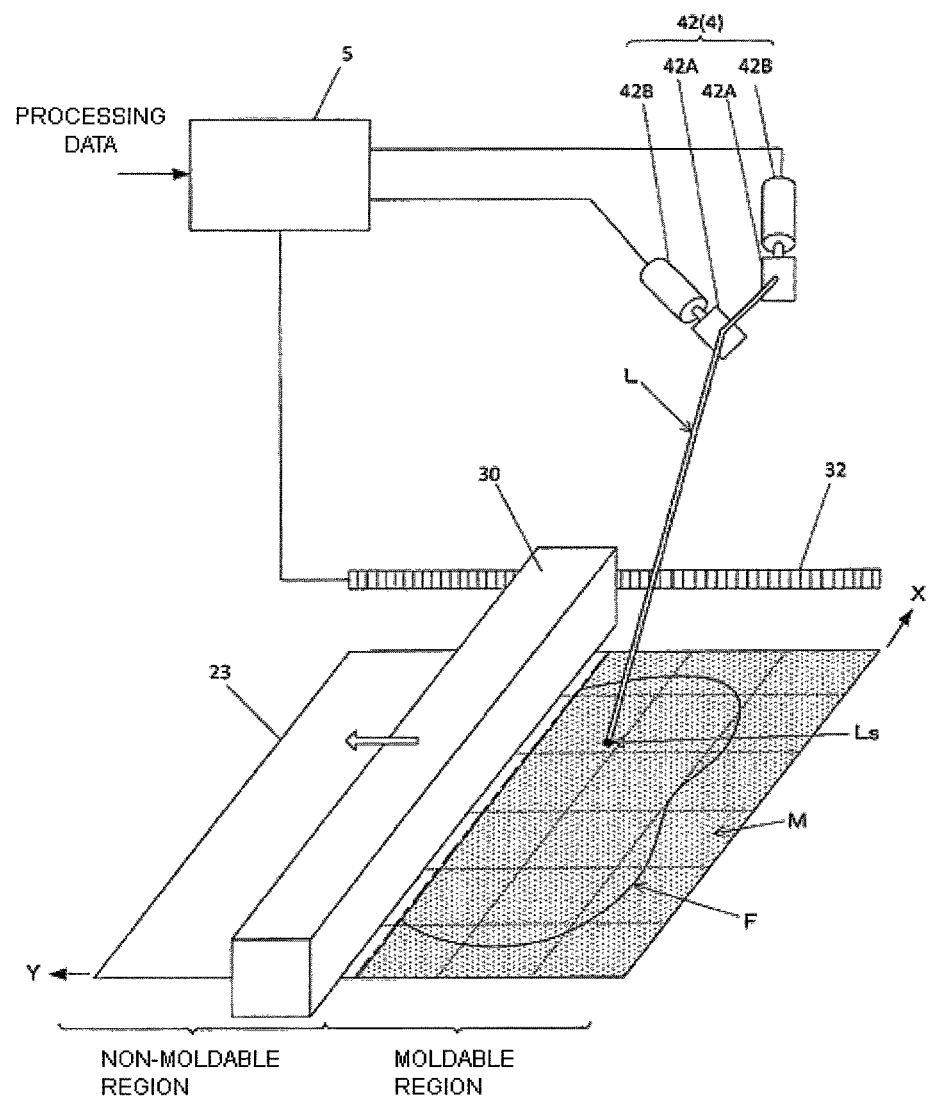
FIG. 2 is an explanatory drawing illustrating operation of a control part in the laminate molding equipment according to the embodiment of the present invention.

FIG. 2 is an explanatory drawing illustrating operation of a control part in the laminate molding equipment according to the embodiment of the present invention. The control part 5 basically controls a light beam or electron beam scanning unit 42 based on received processing data, and scans a radiated location Ls of the light beam or electron beam on the powder layer M laminated on the molding table 23 in a cross-sectional shape F of the molded object. A plane coordinate X-Y of the processing data received in the control part 5 is initially set so as to conform to a plane position on the molding table 23, and the radiated location Ls of the light beam or electron beam is scanned inside the cross-sectional shape F virtually drawn on the molding table 23 by the control part 5 controlling the light beam or electron beam scanning unit 42 in accordance with the processing data.

On the other hand, the control part 5 recognizes, by a detection signal of the moving position detecting unit 32, how far the powder laminating equipment 30 has moved in a predetermined direction of Y-axis illustrated in FIG. 2, and which range is to be a moldable region and which range is to be a non-moldable region on the molding table 23.

The control part 5 recognizes the moldable region on the powder layer M already formed while the powder layer forming part 3 starts forming one powder layer on the molding table 23 and completes the same, and controls the light beam or electron beam scanning unit 42 so as to radiate the light beam or electron beam L in this moldable region. More specifically, the powder laminating equipment 30 continuously moves along the Y-axis direction in FIG. 2, and therefore, the moldable region where the powder layer M has been already formed on the molding table 23 gradually expands along the Y-axis direction after the powder laminating equipment 30 starts moving. Then, when the moldable region overlaps the coordinate within the cross-sectional shape F, radiation of the light beam or electron beam is started within the overlapped range. After that, the scanning range of the radiated location Ls of the light beam or electron beam within the cross-sectional shape F is changed along with expansion of the moldable range according to movement of the powder laminating equipment 30.

Figure 3:
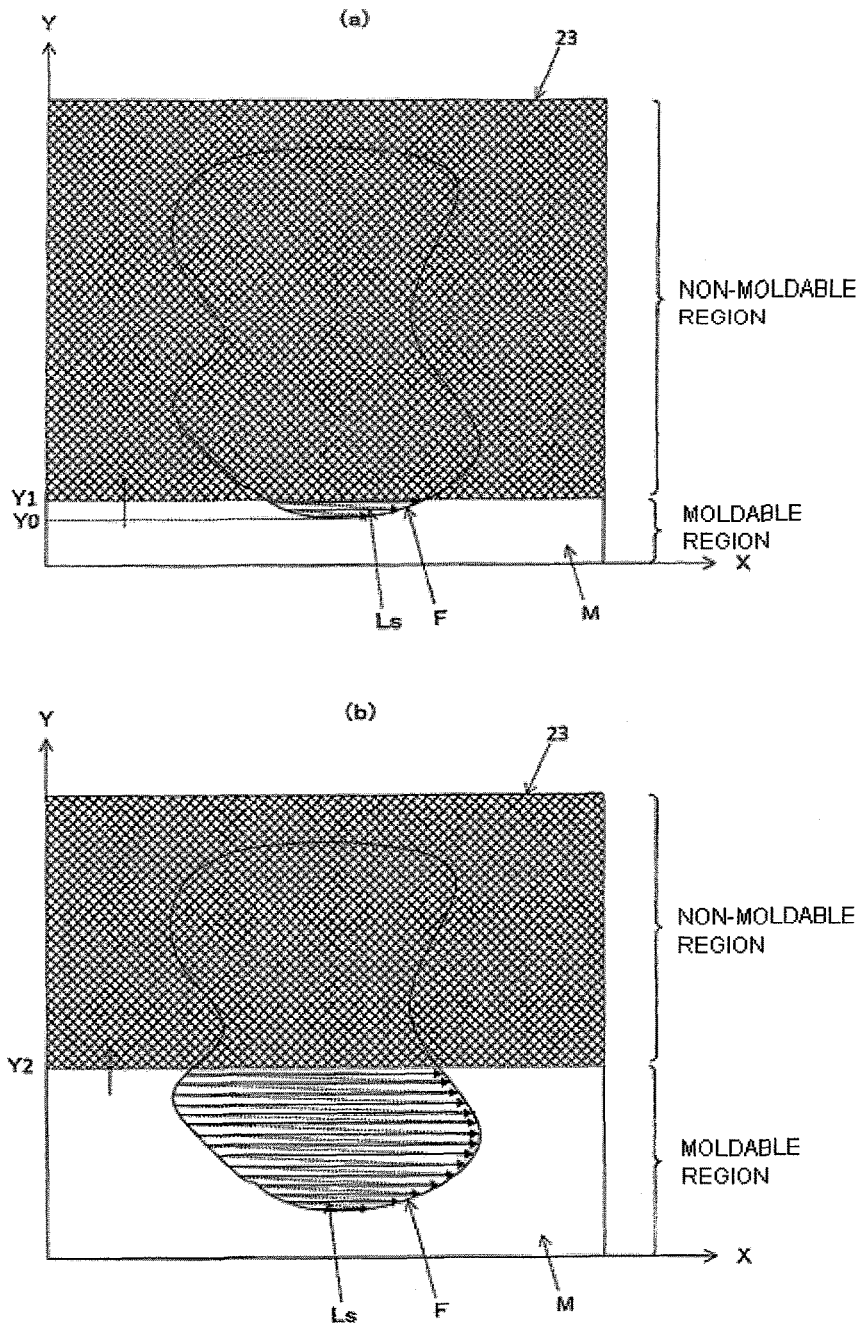
FIGS. 3(a) and 3(b) are explanatory drawings illustrating exemplary scan control executed by the control part of the laminate molding equipment according to the embodiment of the present invention.

FIGS. 3(a) and 3(b) are exemplary scan control by the control part. In the example illustrated in FIGS. 3(a) and 3(b), scanning the radiated location Ls of the light beam or electron beam includes a main scanning along the X-axis direction and a sub-scanning along the Y-axis direction. FIG. 3(a) represents a state immediately after a coordinate region in the cross-sectional shape F overlaps the moldable region, and a Y coordinate (Y1) in the moldable region indicates a coordinate immediately after exceeding a minimum value (Y0) in the Y coordinates of the cross-sectional shape F. FIG. 3(b) represents a state when the powder laminating equipment 30 is further moved, and a Y coordinate (Y2) in the moldable region moves to approximately in the middle of the Y coordinate range of the cross-sectional shape F. As is above illustrated, when the coordinate region inside the cross-sectional shape F overlaps the moldable region, the light beam or electron beam is radiated in the overlapped region, and a main scanning is executed in the X coordinate range inside the cross-sectional shape F in the X-axis direction in accordance with the processing data. Further, as the moldable region expands along with movement of the powder laminating equipment 30, a sub-scanning range of the radiated location Ls of the light beam or electron beam gradually expands along the Y-axis direction.

In the following, other examples according to the embodiment will be described.

EXAMPLE

Figure 4:
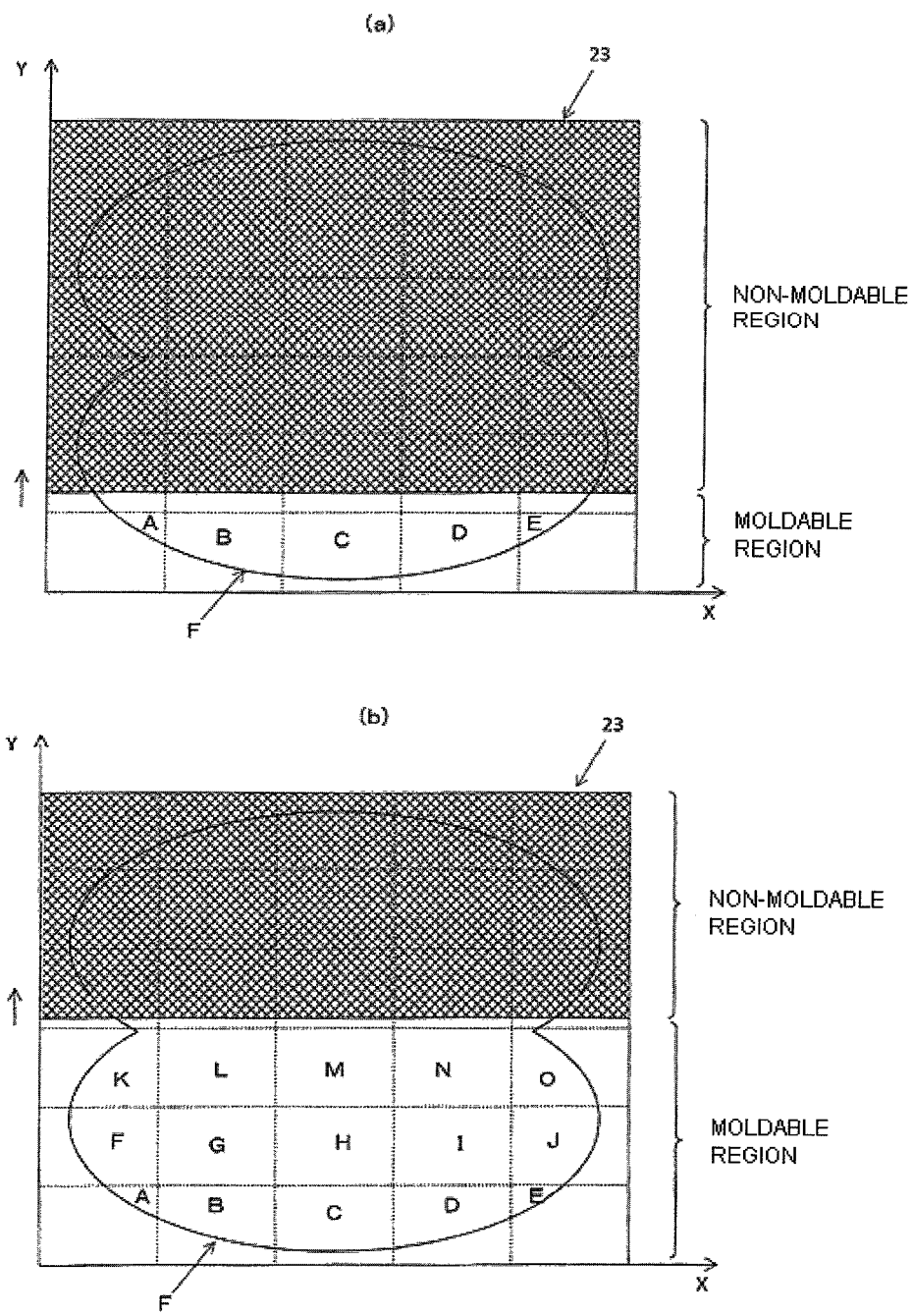
FIGS. 4(a) and 4(b) are explanatory drawings illustrating another exemplary scan control executed by the control part of the laminate molding equipment according to the example of the present invention.
Figure 5:
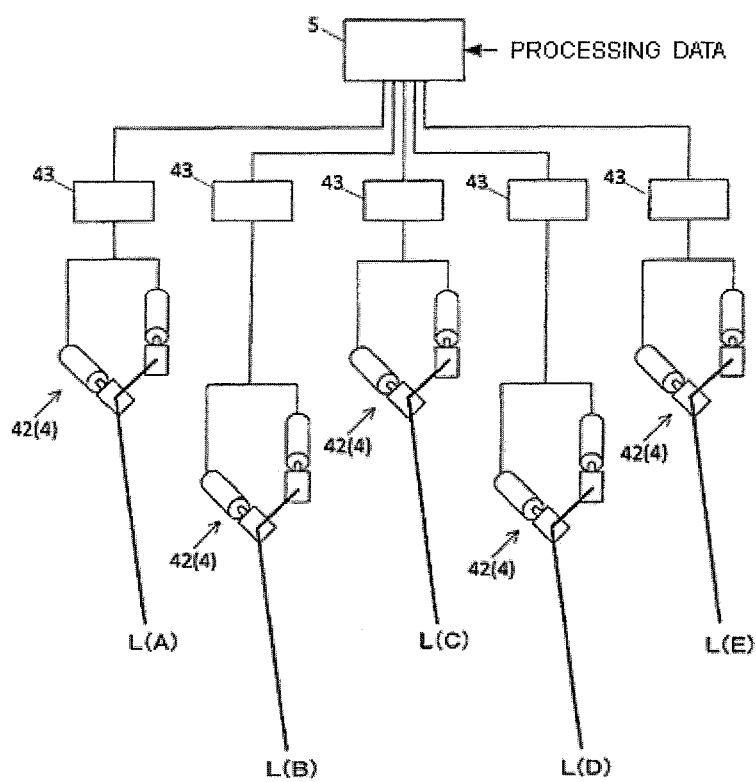
FIG. 5 is an explanatory drawing illustrating a light beam or electron beam scanning unit used for the scan control illustrated in FIGS. 4(a) and 4(b).

According to an example, as illustrated in FIGS. 4(a) and 4(b), a control part 5 recognizes a plurality of divided regions (regions divided by virtual grids) on a molding table 23, and selects a divided region in a moldable region, and further radiates a light beam or an electron beam in the selected divided region. In the concrete exemplary cases in FIGS. 4(a) and 4(b), a region of an X-Y plane on the molding table 23 is divided into five regions in an X-axis direction and into six regions in a Y-axis direction. Further, as illustrated in FIG. 5, a light beam or an electron beam radiating part 4 includes a plurality of light beam or electron beam scanning units 42 corresponding to the divided regions to radiate a light beam or an electron beam L, and a control part 5 simultaneously controls the plurality of light beam scanning units or electron beam scanning units 42 in accordance with individual scanning commands. The plurality of light beam or electron beam scanning units 42 respectively includes driving units 43, and the respective driving units 43 individually control the respective light beam or electron beam scanning units 42 in accordance with the scanning commands from the control part 5.

According to the example, as illustrated in FIGS. 4(a), 4(b) and 5, the light beam or electron beam scanning units 42 are provided for the respective plurality of divided regions divided in the X-axis direction (five divided regions in the cases of FIGS. 4(a), 4(b) and 5), and the plurality of light beams or electron beams L(A), L(B), L(C) and L(D) are radiated to the plurality of divided regions along the X-axis direction, thereby simultaneously applying processing treatment to the plurality of divided regions with the plurality of light beams or electron beams.

Figure 6:
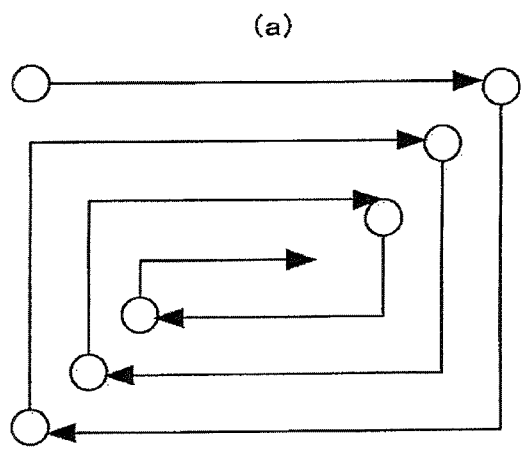
FIGS. 6(a), 6(b), and 6(c) are explanatory drawings illustrating exemplary scanning forms according to the scan control illustrated in FIGS. 4(a) and 4(b).
Figure 6:
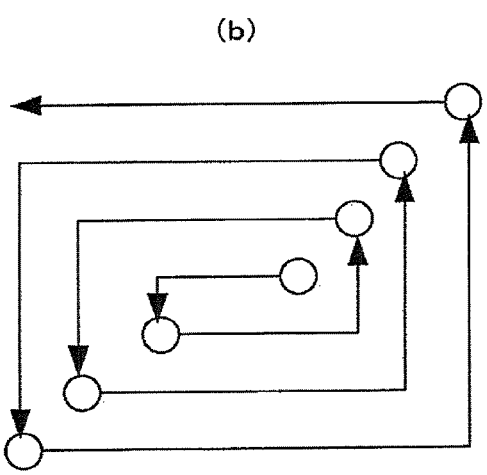
Figure 6:
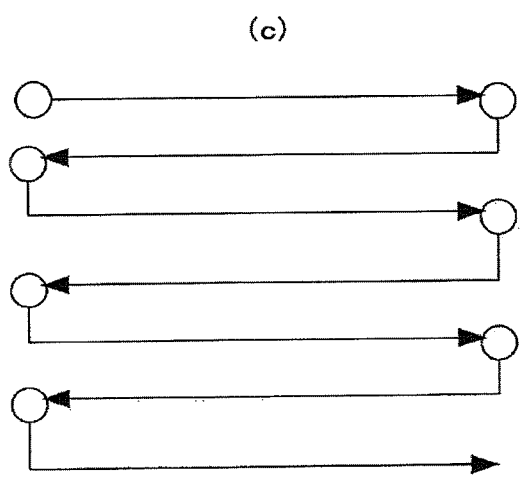

More specifically, as illustrated in FIG. 4(a), when the plurality of divided regions A, B, C, and D divided along the X-axis direction becomes the moldable regions, scanning for a radiated location of the light beam or electron beam is executed with respect to a coordinate region in a cross-sectional shape F in the respective divided regions A to D. At this point, various scanning forms (paths) may be adopted for scanning with the light beam or electron beam in the divided regions. FIGS. 6(a), 6(b), and 6(c) are drawings illustrating examples thereof. The example illustrated in FIG. 6(a) is a spiral path wound inward, and the example in FIG. 6(b) is a spiral path wound outward. Further, the example illustrated in FIG. 6(c) is a zigzag path where the X-axis direction is adopted as main scanning and the Y-axis direction is adopted as sub-scanning.

As illustrated in FIG. 4(b), when the moldable region gradually expands by movement of powder laminating equipment 30, the light beam or electron beam L(A) sequentially applies processing to the divided region A, and then to the divided regions F and K, and other light beams or electron beams also sequentially applies the processing in the same manner to the plurality of divided regions arranged in the Y-axis direction.

APPLICABILITY OF THE INVENTION

As is obvious from the above-described respective embodiment and examples, the laminate molding equipment according to the present invention forms a three-dimensional shape molded object on the molding table by repeating a powder layer forming process of farming a powder layer M of material powder on the molding table, a light beam or electron beam radiating process of radiating a light beam or an electron beam L on the powder layer M and selectively forming a solidified layer, and a process of lowering a setting height of the molding table and forming a new powder layer M on the formed solidified layer. At this point, a moldable region is recognized on the powder layer M already formed while forming the powder layer M is started and forming one powder layer M is completed in the powder layer forming process, and the light beam or electron beam L is radiated in the moldable region in the light beam or electron beam radiating process. With this configuration, the powder layer forming process and the light beam or electron beam radiating process can be partially executed at the same time, thereby molding time can be shortened.

Especially, a control part 5 in the exemplified cases recognizes a plurality of divided regions on the molding table, selects a divided region in the moldable region, and radiates the light beam or electron beam L to the selected divided region. As a result, processing treatment can be simultaneously applied to the plurality of divided regions with different light beams or electron beams L With this configuration, the molding time can be shortened furthermore.

Thus, it is not an exaggeration to say that the present invention has a great deal of potential in the fields of the laminate molding equipment and laminate molding method.

EXPLANATION OF REFERENCES

1: Laminate molding equipment
2: Molding part
21: Base
22: Elevating device
23: Molding table
3: Powder layer forming part
30: Powder laminating equipment
31: Moving device
32: Moving position detecting unit
4: Light beam or electron beam radiating part
40: Light beam or electron beam oscillator
41: Reflecting optical system
42: Light beam or electron beam scanning unit
42A: Scan mirror
42B: Scanning device
5: Control part
L: Light beam or electron beam
M: Powder layer
La: Light beam or electron beam radiated location
F: Cross-sectional shape

What is claimed is:

1. Laminate molding equipment comprising:
a molding part provided with a molding table on which a three-dimensional shape molded object is adapted to be molded;
a powder layer forming part configured to supply material powder on the molding table to form a powder layer;
a beam radiating part configured to radiate one of a light beam and an electron beam to the powder layer on the molding table and select a region to form a solidified layer;
wherein the powder layer forming part includes:
powder laminating equipment configured to sequentially form the powder layer on the molding table by moving along a predetermined direction at the molding table, and
a moving position detecting unit configured to detect a moving position along the predetermined direction at the powder laminating equipment, and
a control part which recognizes the region to be molded by an output from the moving position detecting unit, which controls the beam radiating part in response thereto, and which controls scanning of the radiating position of the beam on the powder layer along a scanning path by adjusting angles of two scan mirrors according to processing data for controlling a scanning device based on recognition thereof, such that the powder layer forming part and beam radiating part are adapted to be partially executed at the same time,
wherein the control part recognizes a plurality of divided regions on the molding table, selects the divided regions in the moldable region and radiates the beam in at least one selected divided region, and
wherein the scanning path adopted in the divided regions is one of the following:
a spiral scanning path that winds inwardly,
a spiral scanning path that winds outwardly, and
a zigzag scanning path.

2. The laminate molding equipment according to claim 1, wherein the beam radiating part includes a plurality of beam scanning units configured to radiate a beam corresponding to the divided regions, and
wherein the control part simultaneously controls the plurality of beam scanning units in accordance with individual scanning commands.

* * * * *